Sept. 11, 1962   J. E. ROBINSON   3,052,921
SPOT VULCANIZING DEVICE FOR TIRES
Filed Feb. 5, 1957   2 Sheets-Sheet 2
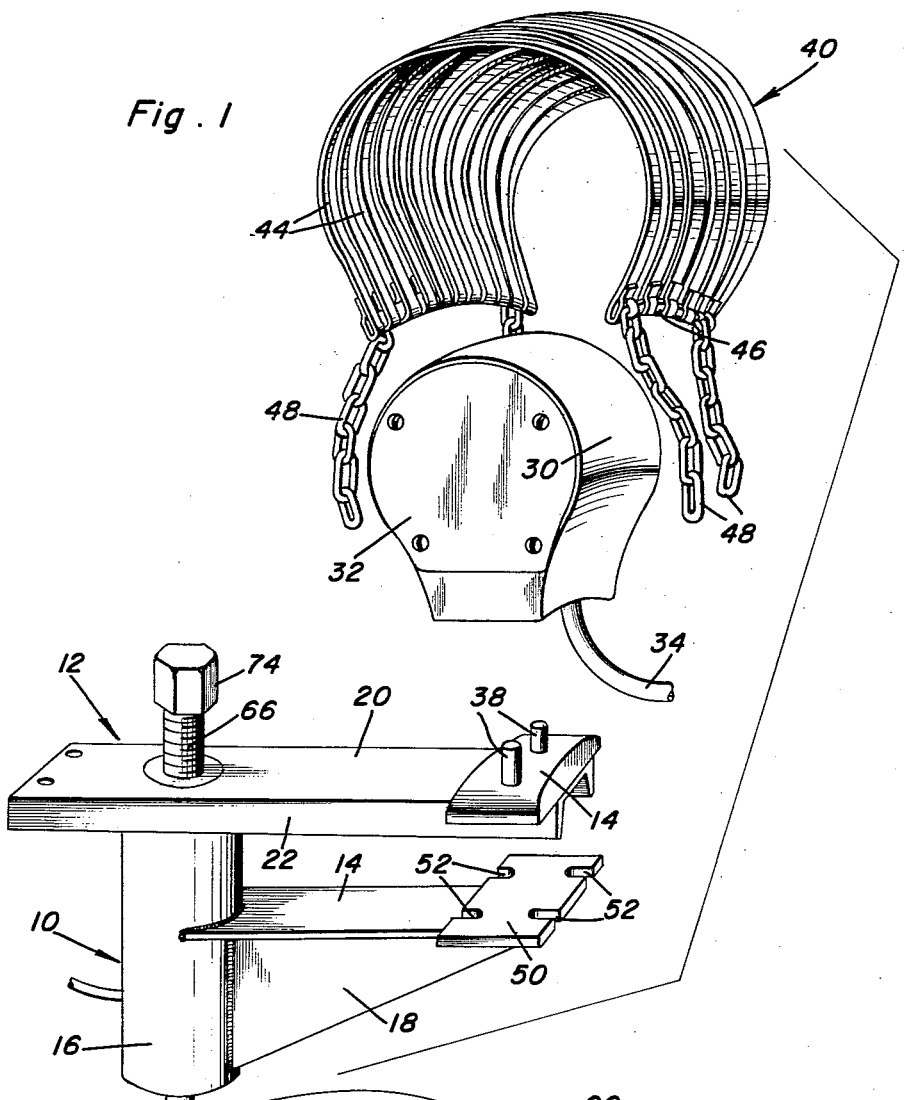
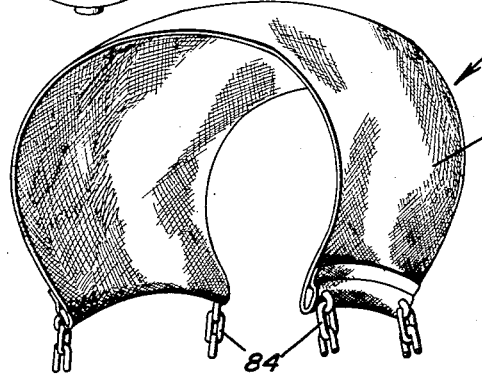
James E. Robinson
INVENTOR.

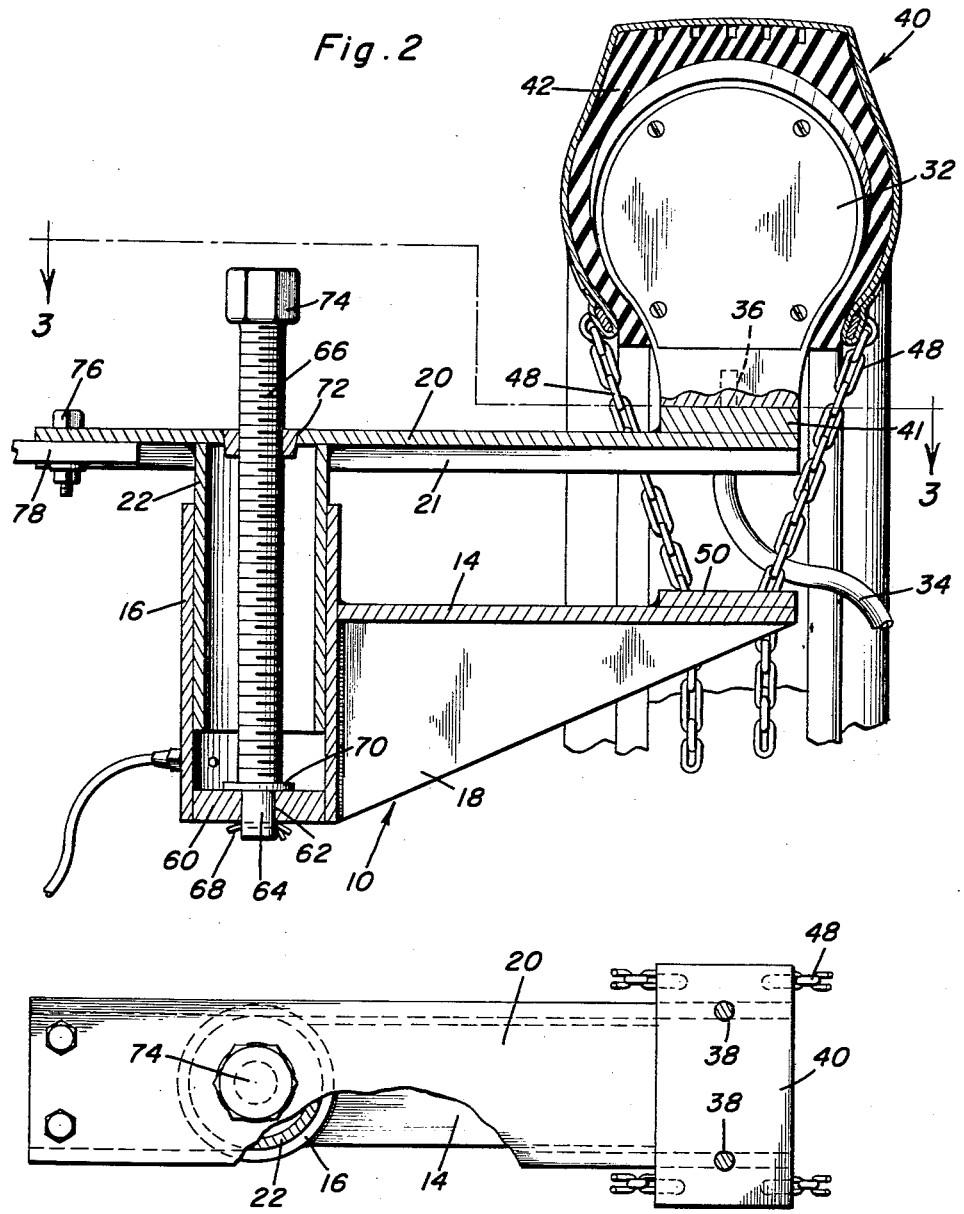

3,052,921
SPOT VULCANIZING DEVICE FOR TIRES
James E. Robinson, La Follette, Tenn., assignor to
John R. Humpston, La Follette, Tenn.
Filed Feb. 5, 1957, Ser. No. 638,410
13 Claims. (Cl. 18—18)

This invention comprises a novel and useful spot vulcanizing device for tires and more specifically relates to a tire mold or mandrel together with improved means for securing a tire thereon and for compressively engaging the tire with the mold to effect a vulcanizing operation upon the tire at a selected portion of the carcass of the same.

The principal object of this invention is to provide a spot vulcanizing mold for tires whereby a tire may be easily and securely engaged thereon for vulcanizing a selected portion of a tire carcass.

A further object of the invention is to provide a vulcanizing device in accordance with the foregoing object which will include a relatively stationary support base with a relatively movable support arm slidably engaged thereon, with a tire mold carried by the arm for receiving a tire thereon and a pliable jacket encircling the tire and the mold and secured to the support base, together with means for causing relative movement of the arm with respect to the base, to thereby cause the jacket to compressively engage the tire upon the mold.

Yet another object of the invention is to provide a spot vulcanizing device in accordance with the foregoing objects wherein the tire mold may be heated either electrically or by steam, as desired.

A further important object of the invention is to provide a vulcanizing device as set forth in the above mentioned objects whereby a plurality of different sizes of tire molds may be readily interchangeably mounted upon the support arm to thereby enable the same device to easily accommodate a plurality of sizes of tires.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a perspective view showing one suitable embodiment in accordance with this invention, the tire retaining jacket and the vulcanizing mold being shown in detached position;

FIGURE 2 is a view in vertical elevation of a suitable form of spot vulcanizing mechanism in accordance with this invention and showing the manner in which a tire is engaged upon the mold and clamped thereon by the jacket in position for spot vulcanizing of the tire carcass;

FIGURE 3 is a horizontal, sectional view taken substantially upon the plane indicated by the broken section line 3—3 of FIGURE 2, part being broken away, and showing certain details of the invention; and FIGURE 4 is a perspective view of a modified form of tire retaining jacket for the device.

In order to accommodate the many different sizes of tires now in use in order to perform spot vulcanizing operations thereon, it is desirable to provide a vulcanizing device having a plurality of interchangeable vulcanizing mandrels or molds. Further, it is important that a tire may be quickly and easily secured to the mold in adjusted position thereon in order to effect vulcanization of a particular portion of the tire carcass.

In the apparatus disclosed in the accompanying drawings, the numeral 10 designates generally a support base for the apparatus, while the numeral 12 designates a support arm assembly which is movably associated therewith.

As will be seen by reference to FIGURES 1 and 2, the support base includes a horizontally extending plate 14 which at one end is welded or otherwise secured to a cylinder or sleeve 16, a triangular bracing plate 18 being fixedly secured thereto.

The support arm assembly includes a plate 20 which along its marginal edges may have depending ribs 21 for purposes of imparting rigidity thereto, the plate 20 being disposed substantially parallel to and overlying the plate 14. Rigidly secured to the underside of the plate 20, as by welding or the like, is a cylinder or sleeve 22 which is complementary to and is telescopingly received in the sleeve 16 for vertical relative sliding movement, whereby the support arm assembly is guidingly associated with the support base assembly for relative sliding movement.

A mandrel or mold 30 is carried by the support arm 20 and is of such shape and size as to be received in a portion of the carcass of a tire for spot vulcanizing a section thereof. Conveniently, this mold may be provided with a removable end plate 32 for obtaining access to the interior thereof, and by means of the conduit or cable 34 the mold may be heated either electrically or by steam, as desired.

The base of the mold is provided with sockets 36, see FIGURE 2, which cooperate with pins or pegs 38 upstanding from and carried by a plate 41 which is fixedly secured to the upper surface of the end of the support arm 20. By this means, a plurality of different sizes of molds 30 may be readily interchangeably carried by and secured to the support arm in order to accommodate different sizes of tires.

Indicated generally by the numeral 40 is a jacket in the form of a pliable or flexible member and which is adapted to embrace the mold 30 and to clamp and retain thereon a tire, such as that indicated at 42 in FIGURE 2. The jacket illustrated in FIGURE 1 may conveniently comprise a plurality of flexible metallic straps or cables 44 having their ends secured to transverse rim members 46 and having tensioning members, such as chains, 48 secured thereto. It is to be understood that the jacket 40 may consist of a network of metallic or other elements, or may comprise a metal screen or mesh as desired. It is merely essential that the same shall have the requisite strength for the purpose intended and sufficient flexibility to cause the same to embrace and snugly engage the tire 42 for clamping the same upon the mold 30 in the manner shown in FIGURE 2.

Cooperating with the tension means 48 of the jacket is a retainer in the form of a plate 50 which is welded or otherwise fixedly secured to the plate 14 of the support base.

The edges of the plate 50 are provided with notches or openings 52 open to the opposite sides thereof and which are adapted to receive and retain the chains 48 forming the tensioning means. Thus, when a tire is placed about the mold and the jacket 40 is then placed about the tire, the chains 48 are then engaged in notches 52 to thus secure the jacket to the tire and the tire to the mold.

It is evident that in place of the notches as retainers may other suitable locking structure may be provided, and the tension means instead of consisting of chains 48 may comprise cables or other tension members.

An actuating means is provided for effecting relative sliding movement between the support arm and the support base, to thereby apply the requisite tension to the tension means for firmly clamping a tire to the mold. For this purpose, a closure plug or anchor plate 60 is welded or otherwise secured in the lower extremity of the sleeve 16 and is provided with an axial bore 62 therethrough. The lower extremity 64 of a screw 66 is journaled in this bore and may be retained therein as by a cotter pin 68. Thus, the screw is secured to the anchor plate 60 for rotational movement but is held against axial movement by means of the cotter pin and by a collar 70 or similar member fixedly carried by the screw. Fixedly secured to the plate 20 of the support arm is a member 72 constituting a nut and which is internally threaded to receive the screw 66. The latter is provided with a head 74 whereby rotation of the screw may be effected. Since the screw is restrained against movement relative to the support base by means of its journal in the anchor plate 60, rotation of the screw will cause vertical sliding movement of the support arm relative to the support base. Thus, the support base and the support arm may be moved towards or from each other to release or tension and secure a tire upon the mold.

Either the support base or the support arm may be carried by a suitable supporting member. In the drawing illustrated, a portion of the plate 20 is provided with a securing bolt 76 by means of which the entire device is carried by and mounted upon a suitable support or mount 78.

Disclosed in FIGURE 4 is a modified construction of jacket. Instead of the flexible metallic construction of jacket 40 previously described, the modified jacket 80 may consists of a band or sheet of a fabric or other flexible material in the form of a strip 82 to which tensioning members 84 are secured. The operation of this form of jacket is identical to that previously described.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A spot vulcanizer for tires comprising a support base, a support arm parallel to and overlying said base, guiding means operatively connecting said arm to said base at one end thereof for relative sliding movement, a vulcanizing mold detachably mounted upon said arm at the other end thereof and adapted to be received within a tire, means for heating said mold, a pliable jacket loosely embracing said mold, fastening means for securing said jacket to the other end of said base, actuating means disposed within said guiding means for effecting movement between said base and arm whereby to compressively clamp a tire positioned upon said mold between said jacket and mold.

2. The combination of claim 1 wherein said guiding means comprises telescoping vertically elongated sleeves carried by said arm and base.

3. The combination of claim 1 wherein said mold and arm have cooperating sockets and pins whereby said mold is releasably attached to said arm.

4. The combination of claim 1 wherein said securing means comprises tension members on said jacket and retainers on said base for detachable engagement by said tension members.

5. The combination of claim 1 wherein said actuating means comprises a screw secured to said base for rotation only and a nut fixed to said arm and engaging said screw.

6. The combination of claim 1 wherein said guiding means comprises vertically elongated telescoping sleeves carried by said arm and base, said actuating means being disposed through said sleeves and operatively engaging said arm and base at the opposite ends of said sleeves.

7. The combination of claim 6 wherein said actuating means comprises a screw secured to said base for rotation only and a nut fixed to said arm and engaging said screw.

8. The combination of claim 1 wherein said actuating means comprises a screw secured to said base for rotation only and a nut fixed to said arm and engaging said screw, said retainers consisting of a plate on said base, said plate having openings therethrough for receiving said tension members.

9. A spot vulcanizer for tires comprising a pair of elongated, spaced, generally parallel and overlying elements constituting a support base and a support arm, cooperating tubular guide members each mounted upon one end of an element and having telescoping sliding engagement with each other, actuating means connected to both elements and extending into said guide members for positively moving said elements towards and from each other, a vulcanizing mold for reception within a tire mounted upon said support arm at the other end of the latter from said guide members, means for heating said mold, a pliable jacket loosely embracing said mold for clamping a tire thereon, fasteners securing said jacket to said support base at the other end of the latter from said guide members.

10. The combination of claim 9 including anchor means on one of said elements on the opposite side of said guide members from said mold and fasteners for mounting the vulcanizer upon a support.

11. The combination of claim 9 wherein said guide members comprise elongated sleeves each rigidly secured to and projecting perpendicularly from an element.

12. The combination of claim 9 wherein said guide members comprise elongated sleeves each rigidly secured to and projecting perpendicularly from an element, said support base being secured to one of said sleeves at a mid-portion thereof, a reinforcing web secured to said support base and underlying the latter along its entire length and being secured to said one sleeve from said mid-portion to an end thereof.

13. The combination of claim 9 wherein said fasteners comprise a plate secured to said support base at said other end thereof and having portions projecting laterally beyond said base, tension members connected to said jacket, said laterally projecting portions having slots detachably receiving and retaining said tension members.

References Cited in the file of this patent
UNITED STATES PATENTS

| | | |
|---|---|---|
| 588,546 | De Wolf | Aug. 17, 1897 |
| 1,411,095 | Henry | Mar. 28, 1922 |
| 2,010,861 | James | Aug. 13, 1935 |
| 2,112,440 | James | Mar. 29, 1938 |
| 2,406,498 | James | Aug. 27, 1946 |
| 2,412,736 | James | Dec. 17, 1946 |